UNITED STATES PATENT OFFICE.

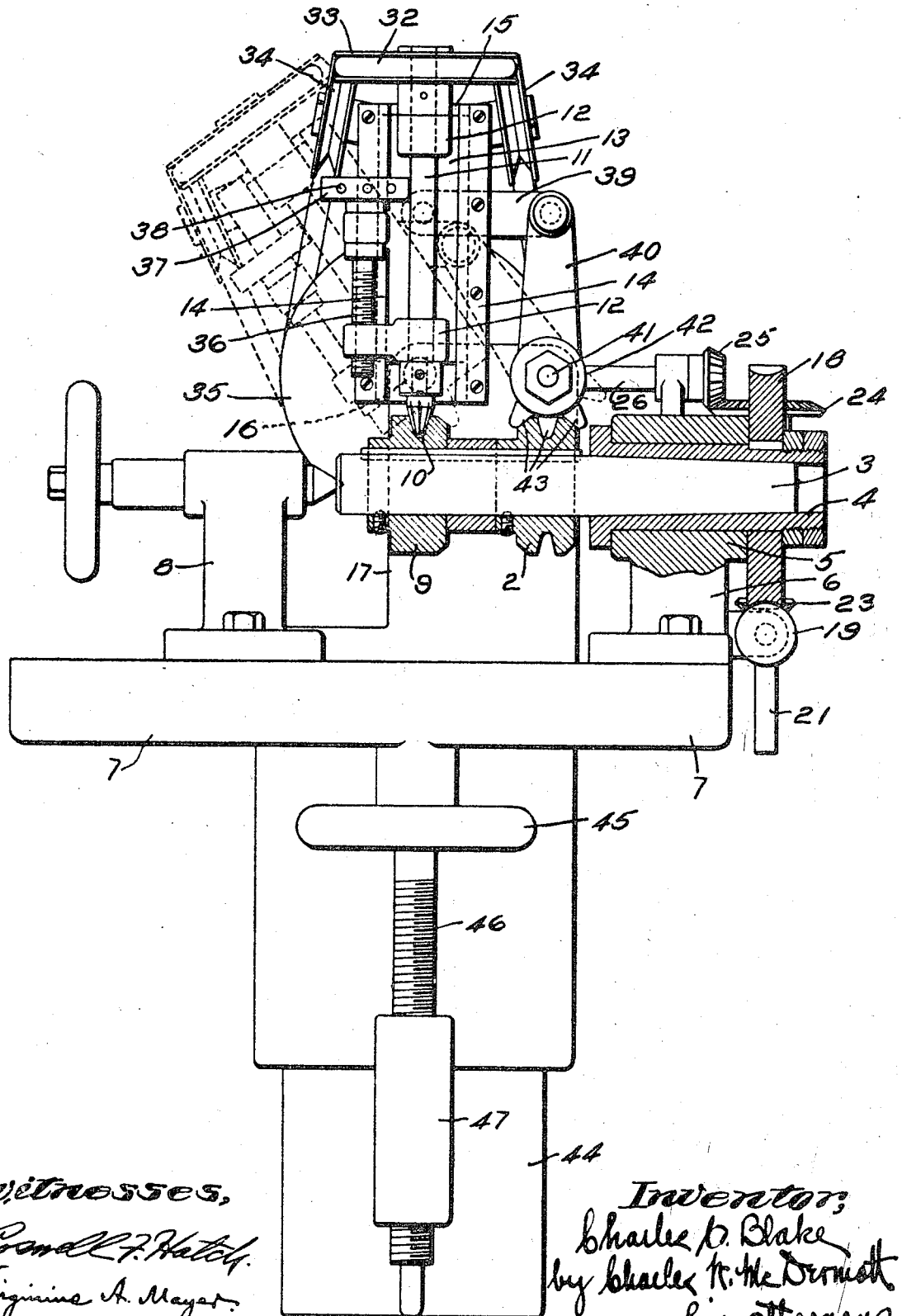

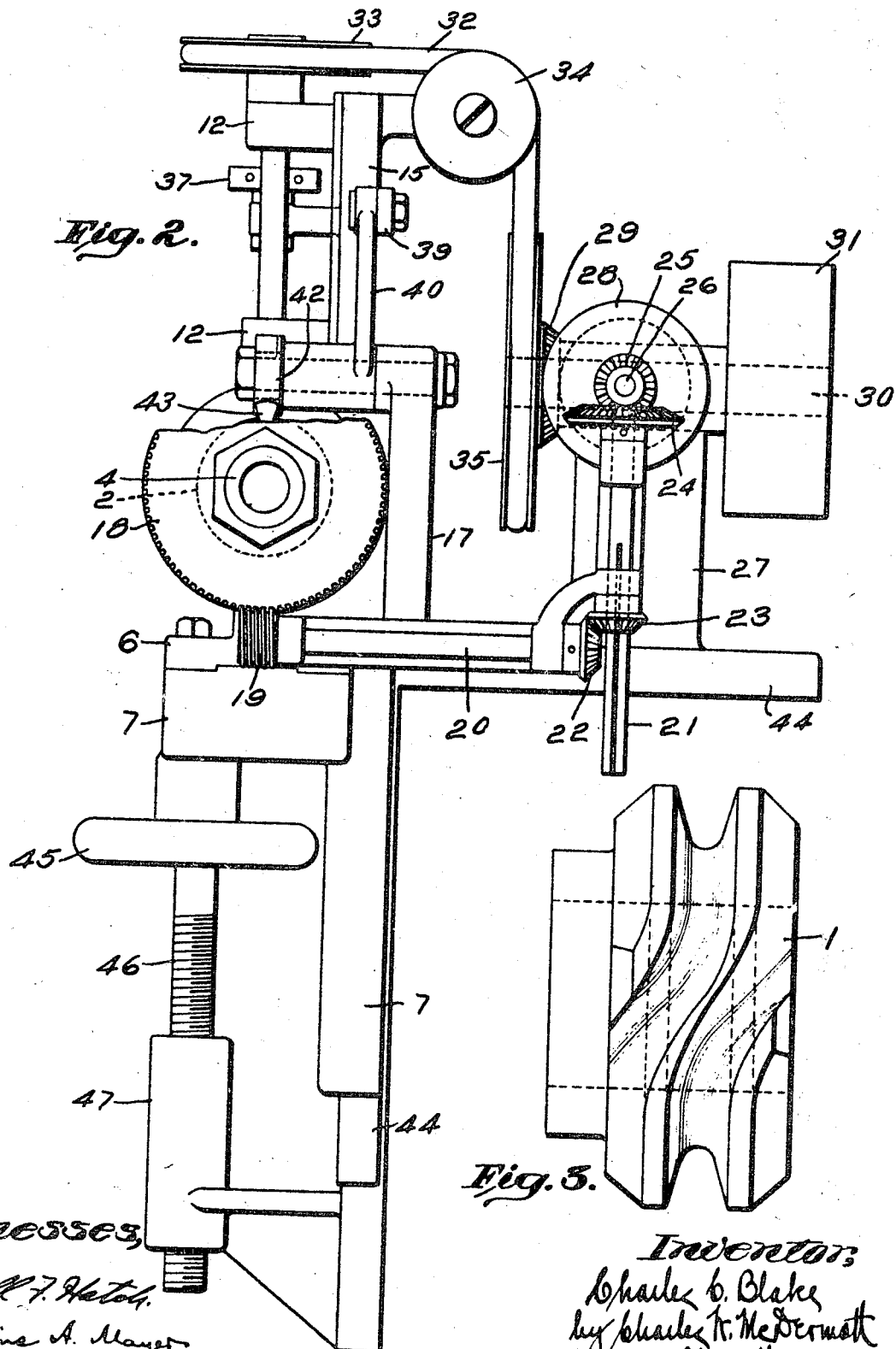

CHARLES C. BLAKE, OF BROOKLINE, MASSACHUSETTS, ASSIGNOR TO C. C. BLAKE, INCORPORATED, OF BOSTON, MASSACHUSETTS, A CORPORATION OF NEW YORK.

MACHINE FOR CUTTING IRREGULAR THREADS.

1,241,910.   Specification of Letters Patent.   Patented Oct. 2, 1917.

Application filed August 27, 1913. Serial No. 786,908.

*To all whom it may concern:*

Be it known that I, CHARLES C. BLAKE, a citizen of the United States, residing at Brookline, in the county of Norfolk and State of Massachusetts, have invented a new and useful Improvement in Machines for Cutting Irregular Threads, of which the following is a specification:

The present invention relates to a machine for cutting irregular threads.

In building machinery it is often desirable to alternately drive and lock a follower through a rotary driver. A common mechanism employed for obtaining this result is the "Geneva" movement. This mechanism comprises a rotary driver provided with a pin which during a single rotation of the driver engages a radial slot formed in the periphery of the follower and imparts thereto one of its feeding steps. When the pin enters the slot it has a minimum pitch velocity. This velocity gradually increases to a maximum as the pin works toward the bottom of the slot and then gradually decreases to the minimum again as the pin emerges from the slot. These differential pitch velocities of the pin subject the parts of "Geneva" movements to great stresses which limit their use to the drive of light duty slow speed mechanisms. It has been proposed to drive heavy duty high speed mechanisms through a "Geneva" movement of exceptionally strong construction but it was found that the limit of speed of the driver thereof was 150 revolutions a minute as at that speed the stresses due to the differential velocities of the pin became so great as to shake the building in which the machine was located. As there are a great number of machines both for light and heavy duty which operate at a speed greatly in excess of 150 revolutions a minute the disability of the "Geneva" movement for use therein seriously handicaps machine designers. I have devised a mechanical movement for alternately driving and locking the follower which may be employed in high speed machinery both for light and heavy duty and which will operate therein with certainty and without noise or liability of breakage of parts. This mechanical movement comprises a driver and a follower. The follower carries a plurality of frusto-conical pins which are engaged by an irregular thread on the driver. The thread for a substantial portion of its length is arranged in a plane normal to the axis of rotation of the driver and terminates at its ends in oppositely disposed bends. When the straight portion of the thread engages the pins the follower is locked and when the pins are engaged by the bends an actuating impulse is imparted to the follower.

The object of the present invention is the provision of a machine for making the drivers of my mechanical movement.

To the accomplishment of this object the features of the invention consist in the devices, combinations and arrangements of parts hereinafter described and then particularly pointed out in the appended claims.

The various features of the present invention will be best understood from an inspection of the accompanying drawings illustrating the invention in its best form at present devised, in which;

Figure 1 is a front elevation, partly in section, of the machine;

Fig. 2 is a right side elevation; and,

Fig. 3 is a plan of the driver made by the machine.

Referring first to Fig. 3 for a general description of the work performed by the machine the driver consists of a cylindrical blank 1 having an irregular thread formed upon its periphery. This thread is arranged for a substantial portion of its length in a plane normal to the periphery of the blank (dotted lines) and terminates at its ends in oppositely disposed bends. These bends by engagement with the pins on the follower impart an impulse thereto at each rotation of the driver the straight portion of the thread locking the follower between the actuating impulses. As illustrated in Fig. 3 the interior and exterior surfaces of the thread are constructed so that they will tangentially engage the frusto-conical pins of the follower. Stated in another way, the transverse outline of the thread is similar to the outline of the central cross section of the tool.

In the illustrated embodiment of the invention one of the drivers is used as a leader 2 (Fig. 1) which is removably secured to a shaft 3. The shaft 3 is tapered at one end so that it may be held in a conical bushing 4 journaled in a bearing 5 formed on a bracket 6 projecting from a table 7. The other end of the shaft 3 is centered on a tail stock 8 adjustably secured to the table 7. A blank 9 for the driver is also removably secured to the shaft 3 with its periphery engaged by a frusto-conical cutting tool 10. This tool is secured to the lower end of a shaft 11 which is journaled in bearings 12 formed on a slide 13. The slide 13 is mounted to slide beneath cover plates 14 secured to a carrier 15 which is pivotally mounted at 16 on a plate 17 rising from a base 44.

In order to transfer the point of operation of the tool 10 around the blank 9 the bushing 4 carries a worm gear 18 which meshes with a worm 19 carried by a horizontal shaft 20 journaled in bearings formed on extensions from the bracket 6. The shaft 20 is driven from a vertical shaft 21 through bevel gears 22 and 23 secured respectively to the shafts 20 and 21. The upper end of the shaft 21 is provided with a bevel gear 24 which is driven through a similar gear 25 on a horizontal shaft 26, journaled in bearings formed on a bracket 27 on the base 44. The shaft 26 carries a second gear 28 which is engaged by a gear 29 on a shaft 30. The shaft 30 is driven through a pulley 31 from some suitable source of power. The tool 10 is rapidly driven during its transfer around the blank through a belt 32 which passes over a pulley 33 on the shaft 11, over idlers 34 carried by the carrier 15 and over a pulley 35 carried by the driving shaft 30. To adjust the tool for different depths of cut one of the bearings for the shaft 11 is engaged by a screw 36 which is held from longitudinal movement on one of the cover plates 14. The screw carries a disk 37 provided with a series of holes 38 which are engaged by a suitable tool when it is desired to raise or lower the tool.

In order to constrain the tool to operate for a substantial part of its transfer around the blank in a plane normal to the periphery of the blank the tool carrier 15 is connected by a horizontal link 39 to a vertical arm 40 which is pivoted at 41 to the plate 17. Secured to the arm 40 is a hub 42 which is provided upon its periphery with three radiating frusto-conical pins 43 shaped similar to the pins carried by the follower of the mechanical movement. These frusto-conical pins are engaged by the leader in the same manner that the pins on the follower are engaged by the driver. That is when the central pin 43 engages the straight portion of the thread the tool 10 is constrained to operate in a plane normal to the axis of the shaft 3 to form the straight portion of the thread in the blank 9. When the angular bends engage the pins 43 the tool is tipped laterally about its pivot 16 to position the tool for the formation of the angular bends in the thread and also for the formation of the exterior bevels. The tool 10 is tipped in one direction for the formation of one exterior bevel (dotted lines Fig. 1) and then in the other direction for the formation of the opposite bevel.

To permit the machine to operate upon blanks of different sizes the table 7 is mounted to slide vertically on the base 44. The table is raised and lowered through a hand wheel 45 carried by a screw 46 threaded in a lug 47 carried by the base 44. The gear 23 is splined to the shaft 21 to permit the table to be adjusted without disturbing the drive of the shaft 20.

While the invention has been illustrated and described for making drivers having grooved threads it will be apparent that drivers having ribbed threads could be produced in the machine without departing from the features of the invention and that the various features of the invention may be useful in machine tools for operating upon or making other devices.

It will be clear to those skilled in this class of machines, with the general object of the present invention in view, that changes may be made in the details of structure, the described and illustrated embodiment thereof being intended as an exploitation of its underlying essentials, the features whereof are definitely stated in their true scope in the claims herewith.

What is claimed as new, is:

1. A machine tool, having, in combination, a blank support, a tool, means for relatively actuating the blank and tool to transfer the point of operation of the tool around the blank, and means for relatively tipping the blank and tool laterally as the point of operation of the tool is transferred around the blank, substantially as described.

2. A machine tool, having, in combination, a blank support, a tool, means for relatively actuating the blank and tool to transfer the point of operation of the tool around the blank, means for constraining the tool to operate during a substantial part of its transfer around the blank in a plane normal to the periphery of the blank, and means for relatively tipping the blank and the support laterally during the remaining portion of the transfer of the tool around the blank, substantially as described.

3. A machine tool, having, in combination, a shaft, a blank carried thereby, a tool, means for rotating the shaft to transfer the point of operation of the tool around the blank, means for constraining the tool to operate during a substantial part of a single rotation of the shaft in a plane normal to the axis of the shaft, and means for tipping the tool laterally in two directions for the remaining portion of the single rotation of the shaft, substantially as described.

4. A machine tool, having, in combination, a shaft, a blank carried thereby, a tool mounted to tip about an axis transverse to and intersecting the longitudinal axis of the tool, means for rotating the shaft to transfer the point of operation of the tool around the blank, and means for guiding the tool during its transfer around the blank to cut in the blank a thread arranged for a substantial portion of its length in a plane normal to the axis of the shaft and terminating at its ends in oppositely disposed bends, substantially as described.

5. A machine tool, having, in combination, a blank, a frusto-conical tool mounted to tip about an axis transverse to and intersecting the longitudinal axis of the tool, means for relatively actuating the blank and tool to transfer the point of operation of the tool around the blank, and means for guiding the tool during its transfer to cut in the blank a thread having a surface tangential to the tool, substantially as described.

6. A machine tool, having, in combination, a blank, a frusto-conical tool, means for relatively actuating the blank and tool to transfer the point of operation of the tool around the blank, and means for guiding the tool during its transfer to cut in the blank a thread having a surface tangential to the tool comprising a leader and a hub connected to the tool provided with a plurality of frusto-conical pins engaged by the leader, substantially as described.

7. A machine tool, having, in combination, a shaft, a blank carried thereby, a frusto-conical tool, a pivoted carrier therefor, means for rotating the shaft to transfer the point of operation of the tool around the blank, and means for guiding the tool during its transfer to cut in the blank a thread having a surface tangential to the tool comprising a leader carried by the shaft, a hub provided with a plurality of frusto-conical pins engaged by the leader, a pivoted carrier therefor, and a link connection between the hub and tool carriers, substantially as described.

8. A machine tool, having, in combination, a support for a cylindrical blank, a tipping tool, means for rotating the blank to transfer the point of operation of the tool a plurality of times around the blank, and means for constraining the tool to operate a substantial part of a single rotation of the blank only in a plane normal to the periphery of the blank, substantially as described.

9. A machine tool, having, in combination, a blank support, a tool, means for rotating the blank to transfer the point of operation of the tool three times around the blank, and means for causing the tool to operate in an inclined position to the periphery of the blank during the first revolution of the blank to form one external bevel on the thread and one angular bend in the groove, in a plane normal to the periphery of the blank during the second revolution of the blank to form the main portion of the groove, and in a reversed inclined position to the periphery of the blank during the third revolution of the blank to form the other external bevel on the thread and the other angular bend in the groove, substantially as described.

10. A machine tool, having, in combination, a blank support; a pivoted tool; a feed for transferring the point of operation of the tool along the blank, the line of feed at the operating point and the pivotal axis of the tool extending in the same general direction; and means for tipping the tool across the line of feed, substantially as described.

11. A machine tool, having, in combination, a blank support, means for feeding the blank, a pivoted tool having the pivotal axis thereof arranged substantially parallel to the line of feed at the operating point, and means for tipping the tool across the line of feed, substantially as described.

12. The combination, with a movable work holder, a tool, and means to support said tool in a position to operate on the work carried by said work holder, of means to impart bodily movement to said tool to cause the cut made thereby to depart from the line of movement of said work and to impart movement to said tool about an axis transverse to its length to cause the wall of the cut to extend at an inclination to the face of the work.

13. The combination, with a rotatable work holder, a tool, and means to support said tool in a position to operate upon the circumferential surface of the work carried by said rotatable work holder, of means to impart movement to said tool to cause the cut made in said surface of said work to depart from the line of rotation of said work and to cause the walls of the cut in said surface to extend at an angle to the radius of said work.

14. The combination, with a movable work holder, a tool, and means to support said tool in a position to operate on the work carried by said work holder, of means to automatically alter the position of said tool transversely to the direction of movement of the work to cause the same to be presented to said work in different angular positions relative to the surface thereof without interrupting the operation of said tool.

15. The combination, with a movable work holder, and a tool, of a tool holder having means to support said tool in operative relation to the work on said work holder and capable of movement transversely to the line of cut to alter the angular position of said tool relative to the surface of the work.

16. In a device of the character described, a tool holder comprising a frame mounted to move about a fixed axis, and a tool mounted on said frame with its longitudinal axis arranged at an inclination to the axis about which said frame moves, the axis of the tool and the axis about which said frame moves being in a common plane.

17. In a device of the character described, a tool holder comprising a frame mounted to move about a fixed axis, a tool mounted on said frame at an inclination to the axis about which said frame moves, means to movably support the work upon which said tool is to operate, and means to move said frame about its axis in timed relation to the movement of said work to cause the tool to be presented in different angular positions relative to the surface of the work.

18. In a device of the character described, a tool-supporting frame mounted for rocking movement, a rotary cutting tool mounted on said frame at an inclination to the axis about which said frame rocks, the axis of the tool and the axis about which said frame moves being in a common plane, a movable work support to move the work into engagement with said rotary tool, and means for causing said frame to be rocked in timed relation with the movement of said work.

19. In a device of the character described, a tool holder comprising a frame movable about a fixed axis and having an arm, a tool supported on said frame at an inclination to said axis, a movable work support, means for actuating said movable work support, and a cam driven from said actuating means and arranged to engage the arm of said frame to impart rocking movement to said frame.

20. The combination, with a rotary work support, and means for actuating the same, of a tool holder comprising a supporting member mounted on a fixed axis, a tool carried by said supporting member and arranged at an inclination to said axis, and an operative connection between said supporting member and the actuating mechanism for said work support to impart movement to said tool relatively to said work.

CHARLES C. BLAKE.

Witnesses:
CATHERINE L. SULLIVAN,
VIRGINIUS A. MAYER.